United States Patent

Armbruster et al.

[11] Patent Number: 5,892,811
[45] Date of Patent: Apr. 6, 1999

[54] RADIO TELECOMMUNICATION NETWORK AND METHOD FOR UNOBTRUSIVE CALL INTERCEPTION VIA TRANSCODER BYPASS

[75] Inventors: Peter Joseph Armbruster, Tempe; Johanna Alexandra Wild, Scottsdale, both of Ariz.

[73] Assignee: Motorola, Inc., Schaumburg, Ill.

[21] Appl. No.: 566,753

[22] Filed: Dec. 4, 1995

[51] Int. Cl.[6] .............................. H04M 1/24; H04M 3/08; H04M 3/22

[52] U.S. Cl. .................................. 379/7; 379/35; 455/12.1

[58] Field of Search .................... 379/7, 9, 14, 58–59, 379/1, 10, 15, 22, 24, 32, 33, 34; 455/556, 517, 73, 74, 74.1, 78, 560, 130, 12.1

[56] References Cited

U.S. PATENT DOCUMENTS

| | | | |
|---|---|---|---|
| 5,255,305 | 10/1993 | Sattar | 379/34 |
| 5,305,308 | 4/1994 | English et al. | 455/33.1 |
| 5,351,239 | 9/1994 | Black et al. | 370/84 |
| 5,361,399 | 11/1994 | Linquist et al. | 455/56.1 |
| 5,392,451 | 2/1995 | Schwendeman et al. | 455/13.1 |
| 5,394,458 | 2/1995 | Allen et al. | 379/34 |
| 5,412,760 | 5/1995 | Peitz . | |
| 5,475,689 | 12/1995 | Kay et al. | 370/95.3 |
| 5,506,837 | 4/1996 | Sollner et al. | 379/59 |
| 5,509,004 | 4/1996 | Bishop, Jr. et al. | 455/12.1 |
| 5,526,397 | 6/1996 | Lohman | 379/58 |
| 5,537,610 | 7/1996 | Mauger et al. | 379/58 |
| 5,550,828 | 8/1996 | Gries et al. | 370/95.1 |
| 5,566,181 | 10/1996 | Huang et al. | 379/58 |
| 5,710,971 | 1/1998 | Armbruster et al. | 379/35 |

*Primary Examiner*—Paul Loomis
*Assistant Examiner*—Binh K. Tieu
*Attorney, Agent, or Firm*—Frank J. Bogacz

[57] ABSTRACT

A digital cellular telecommunication network (30) uses transcoders (50) which vocode voice using a maximal lossy compression algorithm which conserves spectrum usage. A call path for an intercepted call is looped from an outer space satellite (32) network into an intercepting terrestrial gateway (34). Compressed call data for each of two half-calls in this call path bypass normal transcoders (50) through the use of rate adapters (80) which translate between data communication protocols that operate at different data rates without voice coding and decoding. After rate adaptation, the compressed call data are combined in a conference bridge (90), and routed to a monitoring center (60). A subscriber unit (36), a second device (48), and the monitoring center (60) all receive call data which has experienced only one compression/decompression cycle.

18 Claims, 4 Drawing Sheets

RADIO TELECOMMUNICATION NETWORK AND METHOD FOR UNOBTRUSIVE CALL INTERCEPTION VIA TRANSCODER BYPASS

TECHNICAL FIELD OF THE INVENTION

The present invention relates generally to telecommunications. More specifically, the present invention relates to the unobtrusive interception of calls in which compressed call data are being communicated.

BACKGROUND OF THE INVENTION

Many countries in which telecommunication networks, and particularly wireless telecommunication networks, operate have call interception or wire-tap laws. From time to time, such laws require the telecommunication service provider to unobtrusively intercept specified calls taking place within a country's jurisdiction. However, in wireless telecommunication networks, and particularly in digital cellular telecommunication networks, true unobtrusive interception is often difficult to achieve or is achieved by wasteful use of the electromagnetic spectrum.

FIG. 1 shows a block diagram which illustrates call interception in a prior art Global System for Mobile communications (GSM) digital cellular radio telecommunication network. In this prior art network, a subscriber unit (SU) 10 engages in digital RF communication with a base transceiver station (BTS) 12 during a call. The BTS 12 is physically located on or near the surface of the earth within radio range of the SU 10. BTS 12 passes the communication through a base station controller (BSC) 14 to a nearby mobile switching center (MSC) 16 where two half-calls are connected together. Accordingly, for the vast majority of calls, both the SU 10 engaged in the call and the MSC 16 which connects two half-calls together reside within the jurisdiction of a single country. Moreover, for a vast majority of calls, call paths to an SU 10 in a country's jurisdiction pass through an MSC 16 which is also in the country's jurisdiction.

Worldwide telephony networks convey a single digital voice communication using the well known DS-0, 64 kbps, PCM standard. This standard protocol allows an accurate reconstruction of voice band analog signals. However, this standard protocol does not meet the needs of wireless communication because the dedication of outgoing and incoming 64 kbps channels to each call wastes the scarce electromagnetic spectrum which must be shared by all who use it. Consequently, digital wireless networks prefer to compress voice communication and transmit the communication at a lower data rate through a narrower bandwidth RF channel to conserve the spectrum.

Lossless compression would be a highly desirable form of data compression because it would permit expansion or decompression to precisely reconstruct an original data stream. However, lossless compression typically achieves only a modest reduction, for example less than 50%, in data quantity, data rate, and channel bandwidth. Accordingly, wireless telecommunication networks typically prefer to use a form of lossy data compression to achieve greater reductions in data quantity, data rate, and channel bandwidth.

Wireless telecommunication networks often employ the use of transcoders or vocoders to analyze human speech at a source node using sophisticated modeling techniques which reflect human speech capabilities. Transcoders compress voice using lossy compression techniques. Well known speech analysis techniques allow digitized speech of acceptable quality to be transported at data rates much lower than 50% of the DS-0 rate. Thus, the prior art network depicted in FIG. 1 uses a 13 kbps data rate for RF links. The use of lower data rates than DS-0 permits the telecommunication network to transport more human speech in the form of calls in a given geographical area using a given amount of spectrum. However, the lossy nature of these compression techniques prevents precise reconstruction of original voice signals.

As illustrated in FIG. 1 for a conventional wireless telecommunication network, a wireless half-call is routed through a high quality (HQ) transcoder 18 for decompression. Decompressed voice communication from two half-calls are connected together in the MSC 16. When the call is to be intercepted, this connection is formed through a conference bridge 20. A third port of the conference bridge 20 provides combined, decompressed voice communication from the two half-calls for routing to a monitoring center, as illustrated at call path 22.

The MSC 16 couples to the wire-based public switched telecommunications network (PSTN). A vast majority of communication with a typical SU 10 is conducted with telephonic devices coupled to the PSTN through a call path 24. Less often SU 10 communicates with an SU 10' supported by the same or other BSCs 14. When a second half-call is associated with SU 10', the second call path is routed through another HQ transcoder 18 for recompression prior to RF transport to SU 10'. The quality of communication suffers when SU 10 communicates with an SU 10' because two compression/decompression cycles are experienced. Since reconstruction of an original signal after a single compression/decompression cycle is not precise, reconstruction of an original signal after two sequential compression/decompression cycles is even less precise. However, since HQ transcoders are employed, only a minor signal quality degradation results from two compression/decompression cycles. Whether or not SU 10 is communicating with another SU 10' or with a telephonic device coupled through the PSTN, the signal quality is the same as it would be whether or not the call is being intercepted. Thus, calls are intercepted unobtrusively.

This conventional wireless communication network undesirably wastes the spectrum due to its reliance upon HQ transcoders. While HQ transcoders permit significant reductions over DS-0 rates, they fall far short of implementing maximal lossy compression and decompression algorithms. Maximal lossy voice compression and decompression algorithms are well known. Such algorithms permit the transmission of acceptable quality voice communication at data rates as low as 2.4 kbps. However, signal reconstruction after two compression/decompression cycles is noticeably inferior to signal reconstruction after one compression/decompression cycle. The prior art telecommunication network avoids using maximal lossy compression, at least in part, because the double compression/decompression cycles would yield unacceptably low quality voice signals.

In addition, the prior art wireless communication network is undesirable because it requires completion of a compression/decompression cycle for each SU half-call prior to connecting half-calls together in an MSC, whether or not the call will be intercepted. This requirement causes the prior art telecommunication network to avoid maximal lossy compression. However, in a network which uses maximal lossy compression to achieve improved spectrum usage, additional compression/decompression cycles are avoided to maintain reconstructed voice signal quality. In such a network call interception could become obtrusive rather than unobtrusive if additional compression/decompression cycles were required to intercept a call.

DETAILED DESCRIPTION OF THE DRAWINGS

Figure 1:
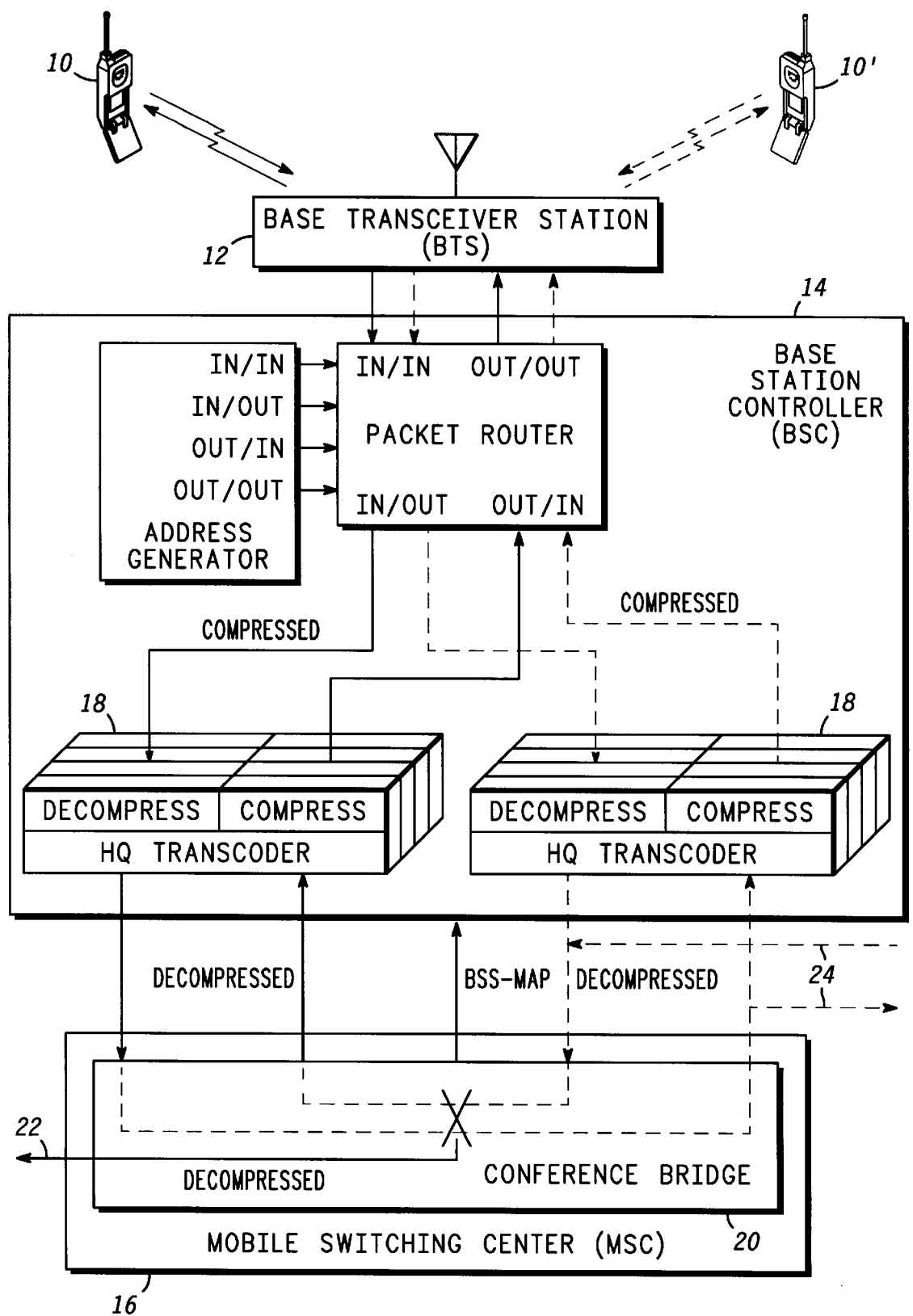
FIG. 1 shows a block diagram which illustrates call interception in a prior art GSM digital cellular radio telecommunication network.
Figure 2:
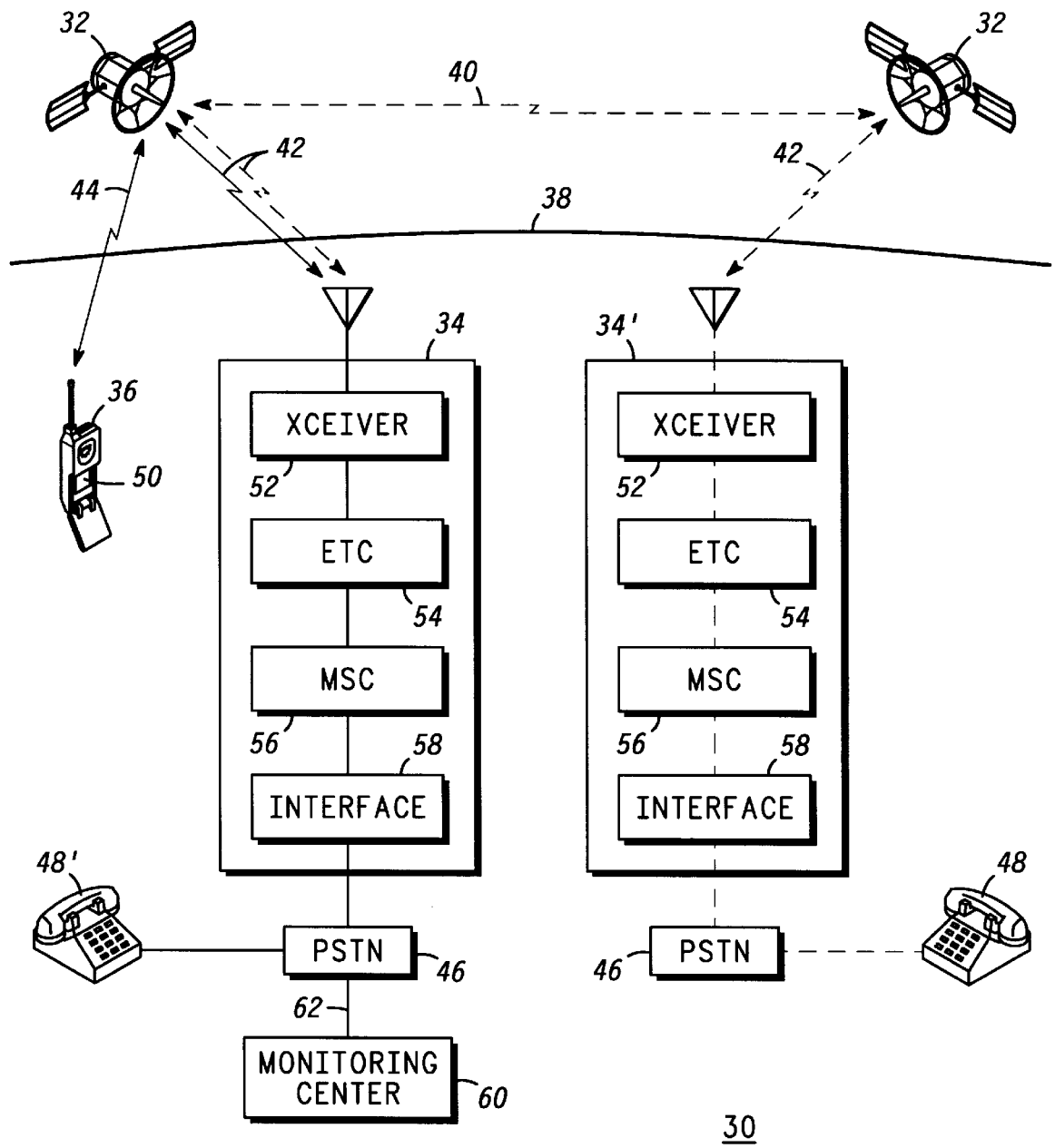
FIG. 2 shows a block diagram which illustrates the environment within which a radio telecommunication network and method configured in accordance with the teaching of the present invention may be practiced.

FIG. 2 shows a schematic representation of a digital, cellular communication network 30. In the preferred embodiment, network 30 includes satellites (SVs) 32, gateways 34, and subscriber units (SUs) 36. Satellites 32 are located in outer space while gateways 34 and subscriber units 36 reside on or near the surface 38 of the earth. Each satellite 32 has its own coverage area which extends over only a fraction of earth surface 38. This coverage area is approximately the region of surface 38 that is within a line-of-sight view of the satellite 32 at any given instant. Satellites 32 are or may be in radio communication with other satellites 32 that are in-view over RF communication trunks 40, with in-view gateways 34 over RF communication trunks 42, and in-view subscriber units 36 over radio links 44.

As presently preferred, sixty-six satellites 32 are arranged in a constellation of eleven, low earth, polar orbits, but this is not a requirement. FIG. 2 shows only two of these satellites 32 for convenience. Antennas (not shown) on satellites 32 form patterns projected toward the earth that define cells (not shown) through which cellular communication services are offered to subscriber units 36. Cellular communication services are provided through subscriber units 36 from any point on the earth covered by a cell, and a blanket of cells desirably covers substantially the entire earth. Network 30 may include any number of subscriber units 36.

Likewise, network 30 may include any number of gateways 34. However, network 30 may desirably deploy gateways 34 in accordance with geopolitical jurisdictions and include many fewer gateways 34 than subscriber units 36. Gateways 34 couple network 30 with local public switched telecommunication networks 46 and the multitude of telephonic devices 48 that couple thereto. In addition, gateways 34 hold and employ a large portion of the intelligence required to operate network 30.

Satellites 32 and gateways 34 represent network nodes which are switching centers for network 30. Each network node receives incoming signals from any of a plurality of origins and switches the incoming signals to any of a plurality of destinations. In the preferred embodiments, these signals may be in the form of digital packets which convey call data. The purpose of network 30 is to communicate the information represented by these call data.

Subscriber units 36 and gateways 34 include transcoders or vocoders 50 to transform analog audio signals into digital packets and vice-versa. Transcoders 50 located within gateways 34 are discussed below in connection with FIG. 3. Each transcoder 50 may include both a voice coder to compress voice call data and a voice decoder (not shown) to decompress compressed call data. A substantially continuous stream of communication data packets are required to support a communication path with a subscriber unit 36. Standard transcoders 50 in network 30 implement well known maximal lossy compression vocoding algorithms. For the purposes of the present invention, maximal lossy compression of voice information occurs when the compressed voice can be represented by a stream of data at a data rate of less than 6.4 kbps, or $\frac{1}{10}$ of the DS-0 rate. In the preferred embodiment, transcoders 50 compress/decompress voice at a 2.4 kbps rate. The use of maximal lossy compression is highly desirable because it allows more calls to be conveyed by a given amount of spectrum in a given area when compared to non-maximal lossy compression or to lossless compression.

Each gateway 34 includes a transceiver 52 which directly communicates with satellites 32 over an RF communication trunk 42. Transceiver 52 couples to an earth terminal controller (ETC) 54, which couples to a mobile switching center (MSC) 56. As will be discussed in more detail below, transcoders 50 are implemented within gateway 34 in ETC 54. A PSTN interface 58 couples to mobile switching center 56. Interface 58 directly communicates with PSTN 46.

In the preferred embodiment of the present invention, mobile switching centers 56 are substantially conventional mobile switching centers as used in the terrestrial-based Global System for Mobile telecommunications (GSM). Mobile switching centers 56 employ the intelligence needed to make connections between half-calls. Such connections are defined in a conventional manner. In addition, mobile switching centers 56 provide both basic and supplementary switching services as needed, again in a conventional manner.

Those skilled in the art will appreciate that basic services are concerned with exchanging information, such as voice communication, between two parties. Supplementary services augment basic services by, for example, allowing a user to participate in multiple connections simultaneously, to suspend information transfer on a connection without terminating it, to link other users to the same connection, to redirect connection establishment attempts toward another user or another service, and the like.

Gateways 34 and the mobile switching centers 56 therein have a jurisdiction based upon geopolitical boundaries. A subscriber unit 36 resides within the jurisdiction of a gateway 34 if its current location is within the geopolitical boundaries assigned to the gateway 34. When a subscriber unit 36 is within the jurisdiction of a mobile switching center 56, that mobile switching center 56 becomes involved in setting up and managing calls involving the subscriber unit 36. For the purposes of the present invention, the other party to the call is referred to as a second device (SD). A half-call is associated with the subscriber unit 36 and another half-call is associated with the second device. The figures illustrate a half-call associated with subscriber unit 36 using solid lines and a half-call associated with second device 48 with dotted lines.

When a mobile switching center 56 determines that the second device half-call it is being asked to connect resides within its jurisdiction through PSTN 46, it routes a second device communication path through interface 58 toward PSTN 46 and the second device (SD) 48'. When mobile switching center 56 determines that the second device half-call does not reside within its jurisdiction through PSTN 46, the call path is not routed through that gateway 34 when basic services are being requested.

Rather, for basic services the call path is switched as needed in satellites 32 and routed to the earth only as needed to link up with a second device 48. In a space-based network, such as network 30, a call path is not necessarily required to extend to a gateway 34 residing in a country where interception has been requested. As illustrated in FIG. 2, second device 48 may be reached through another gateway 34' rather than the gateway 34 that services the subscriber unit 36 involved in the call. The omission of routing calls through gateways 34 conserves spectrum on RF trunks 42 while improving performance by omitting signal delay associated with switching through gateway 34. While FIG. 2 illustrates second devices 48 and 48' as being conventional telephonic devices coupled to a PSTN 46, nothing prevents other subscriber units 36 from operating as second devices.

On the other hand, when a mobile switching center 56 determines that the subscriber unit's call is to be intercepted, the call is treated, at least in part, as though supplementary services were being requested. In particular, the call path is routed through the intercepting gateway 34 regardless of the location of second device 48. Those skilled in the art will appreciate that with the presence of a constellation of satellites 32 in outer space, call path routing for basic services would not need to include terrestrial network nodes, such as intercepting gateway 34. However, network 30 routes the call path to an intercepting gateway 34 within the jurisdiction of a country requesting a call intercept merely to accommodate the call intercept request.

The supplementary services form of call treatment causes the intercepted call to experience different routing and processing than a non-intercepted call experiences. However, the supplementary services form of routing and processing of the call path through intercepting gateway 34 exerts substantially no influence on the signal quality, and the interception is unobtrusive.

When a call to be intercepted is established between subscriber unit 36 and, for example, second device 48, subscriber unit 36 obtains call data from the user of subscriber unit 36 through a microphone or other input device. Subscriber unit 36 digitizes the user's voice and passes the resulting data through transcoder 50 to generate compressed call data. As discussed above, transcoder 50 performs a maximal lossy compression algorithm which allows the voice to be represented digitally in a stream of data having a data rate as low as 2.4 kbps.

Subscriber unit 36 transmits the compressed call data to an intercepting gateway 34 in whose jurisdiction the subscriber unit 36 resides. The compressed call data are transmitted over a communication path that includes radio link 44 and RF communication trunk 42. The network node provided by satellite 32 serves as a bent-pipe repeater which repeats the compressed call data received over radio link 44 at RF communication trunk 42. As discussed in more detail below, the compressed call data are processed through a conference bridge (not shown) in intercepting gateway 34 and passed both to a monitoring center 60 over a call path 62 and back toward satellite 32 over RF communication trunk 42. The compressed call data passed back to satellite 32 are transmitted onward through network 30 until they can be decompressed and delivered at second device 48. FIG. 2 illustrates an example wherein gateway 34' is in communication with second device 48 and performs this decompression operation.

Likewise, second device 48 obtains return call data from a user of that device and passes the return call data to gateway 34'. Gateway 34' compresses the return call data into return compressed call data. These return compressed call data are transmitted through satellites 32 to intercepting gateway 34. Intercepting gateway 34 processes the return compressed call data through the conference bridge and routes return compressed call data both to monitoring center 60 and back toward subscriber unit 36 through satellites 32.

As discussed in more detail below, the processing of compressed call data and return compressed call data performed in intercepting gateway 34 does not add a compression/decompression cycle to the communication path established between subscriber unit 36 and second device 48. Accordingly, network 30 uses maximal lossy compression in transmitting voice call data through RF communication links but refrains from performing more than one compression/decompression cycle even when a call is being intercepted. Consequently, signal quality in both reconstruction accuracy and signal delay is substantially unaffected, and call interception may be performed unobtrusively.

Figure 3:
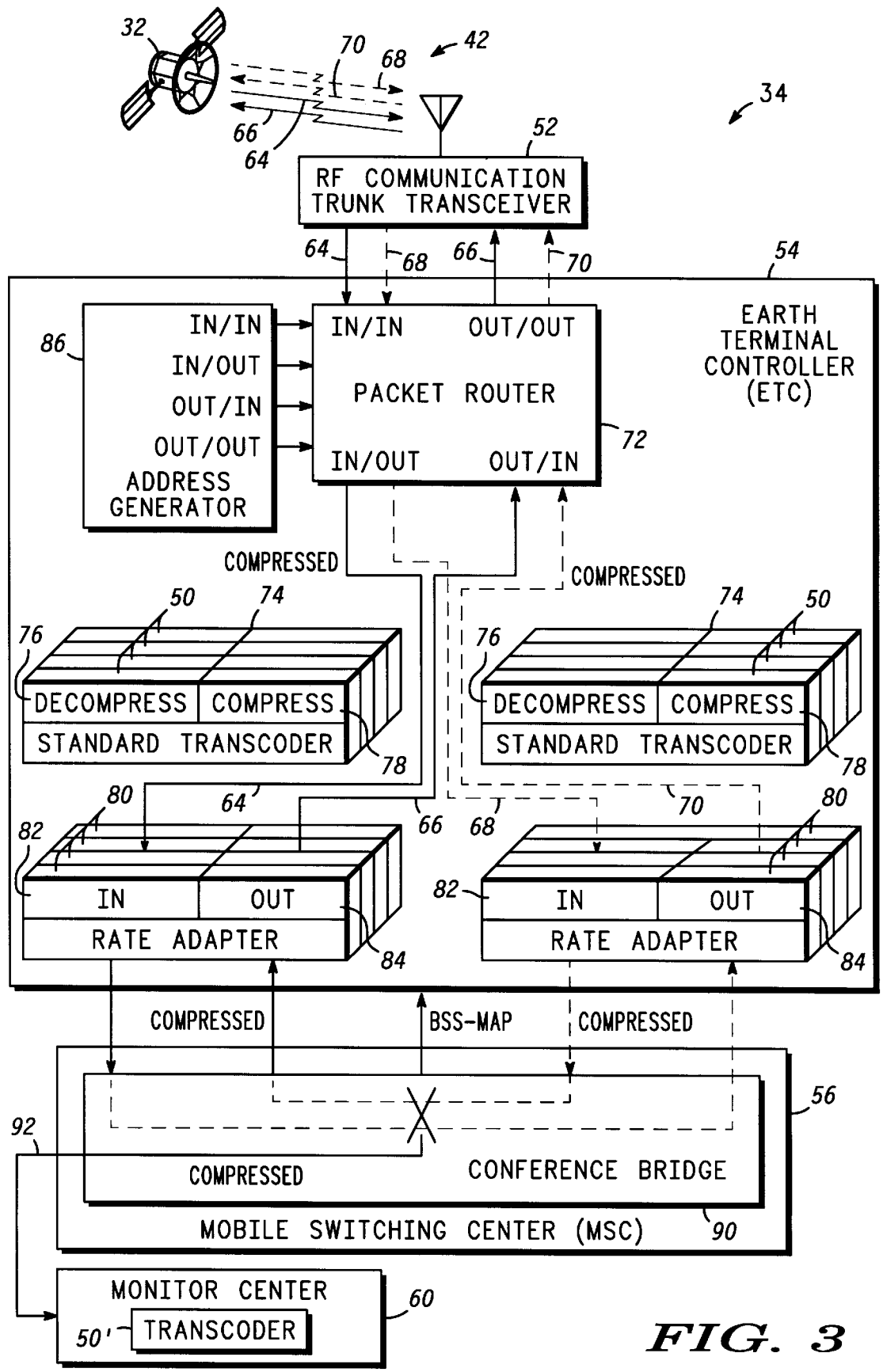
FIG. 3 shows a block diagram of a gateway portion of the network.

FIG. 3 shows a block diagram of intercepting gateway 34, hereinafter called intercepting node 34 of network 30. Gateway 34' has a similar structure, except that gateway 34' may omit the use of a conference bridge because call interception is performed in intercepting node 34 rather than gateway 34'. A channel 64 of RF communication trunk 42 provides incoming compressed call data from subscriber unit 36 (see FIG. 2). A channel 66 of trunk 42 provides outgoing return compressed call data to subscriber unit 36. Channels 64 and 66 together support a subscriber unit half-call. A channel 68 of RF communication trunk 42 provides incoming return compressed call data from second device 48 (see FIG. 2). A channel 70 of trunk 42 provides outgoing compressed call data to second device 48. Channels 68 and 70 together support a second device half-call. RF communication trunk transceiver 52 terminates trunk 42 and connects channels 64, 66, 68, and 70 to earth terminal controller 54.

In earth terminal controller 54, channels 64 and 68 are routed from transceiver 52 to an input port of a packet router 72 for data coming into intercepting node 34 (IN/IN). Channels 66 and 70 are routed to transceiver 52 from an output port of packet router 72 for data going out of intercepting node 34 (OUT/OUT). Packet router 72 is a conventional switching device which connects various channels at transceiver 52 with various transcoders 50 selected from transcoder banks 74 in non-intercepted calls. Transcoder banks 74 include any number of standard rate transcoders 50, and desirably include a sufficient number of transcoders to accommodate the maximum number of non-intercepted calls which can be processed by intercepting node 34. Each transcoder 50 includes a decompress section 76 and a compression section 78. As discussed above, standard rate transcoders 50 in network 30 provide maximal lossy compression, as opposed to high quality transcoders which avoid maximal lossy compression.

However, as discussed in more detail below, for intercepted calls packet router 72 connects various channels at transceiver 52 with various rate adapters 80 that are used in lieu of transcoders 50. Rate adapters 80 provide data rate adaptation without compressing or decompressing. Desirably, intercepting gateway 34 includes a sufficient number of rate adapters 80 to allocate two rate adapters 80 to each intercepted call that can be concurrently handled by the intercepting gateway 34. An incoming (IN) section 82 of each rate adapter 80 adapts data from the maximal lossy compression data rate, for example 2.4 kbps, to a higher data rate, for example DS-0. An outgoing (OUT) section 84 of each rate adapter 80 adapts data from the higher data rate to the maximal lossy compression data rate. Rate adaptation is required because a conventional mobile switching center 56 is configured to handle DS-0 call paths. The output data from incoming sections 82 and the input data to outgoing sections 84 of rate adapters 80 are still compressed call data because no voice decoding (i.e. decompression) or voice coding (i.e. compression) is performed. Rather, rate adapters 80 translate between lower and higher data rate protocols either of which is capable of conveying the compressed call data.

Identities of rate adapters 80 are specified to packet router 72 for data flowing into intercepting node 34 (OUT/IN) and for data flowing out from intercepting node 34 (IN/OUT). Those skilled in the art will appreciate that packet router 72 may be viewed as a collection of buffers, and that connections are made by specifying buffer addresses in accordance with a time and/or space switching matrix scheme. Accordingly, an address generator 86 is programmed to accommodate connections through packet router 72. Address generator 86 specifies addresses for buffers used by IN/IN, IN/OUT, OUT/IN, and OUT/OUT ports of packet router 72 in accordance with base station system management part (BSS-MAP) like instructions provided by mobile switching center 56. BSS-MAP represents a well known instruction protocol used in GSM.

Incoming sections 82 of the rate adapters 80 assigned to the intercepted call path generate compressed and return compressed call data. However, the compressed call data generated by rate adapters 80 is generated at the DS-0 rate. These compressed call data are routed from the assigned rate adapters 80 to mobile switching center 56, and particularly to a conference bridge 90 which is assigned to the intercepted call.

Within mobile switching center 56 the subscriber unit and second device half-calls are connected together in a conventional manner. Compressed call data for the subscriber unit and second device half-calls are routed to outgoing sections 84 of the rate adapters 80 assigned to the call. The outgoing sections translate the compressed data back to the maximal lossy compression data rate, where they are then passed back to packet router 72. Within packet router 72, the compressed and return compressed call data are placed in appropriate buffers so that they may be transmitted toward second device 48 and subscriber unit 36, respectively.

Accordingly, rate adapters 80 are used to bypass transcoders 50 within intercepting node 34. Since rate adapters do not compress or decompress the call data, multiple compress/decompress cycles are avoided along with the signal quality deterioration and signal delay imposed thereby.

A third port 92 of conference bridge 90 generates combined compressed call data. As is conventional through the operation of a conference bridge, incoming data from both half-calls are combined, and a combined signal is output at third port 92. However, for call interception, nothing requires a voice path from monitoring center 60 to either of subscriber unit 36 or second device 48. Accordingly, a null or otherwise silent incoming signal is desirably provided (not shown) at an incoming portion of port 92 for the call path to monitoring center 60.

Conference bridge 90 combines compressed call data from both half calls and transmits that combined compressed data toward monitoring center 60. A transcoder 50' is included in the call path between mobile switching center 56 and monitoring center 60 to decompress the compressed combined call data. As shown in FIG. 3, a transcoder 50' may be provided at monitoring center 60, but this is not a requirement.

Accordingly, a call is intercepted by combining the compressed call data from both half calls in conference bridge 90, and routing the combined, compressed call data toward monitoring center 60. Voice reconstruction quality remains the same as if call interception were not being performed, and delay associated with a decompression/compression cycle is avoided. Decompression for monitoring center 60 is performed in the call path formed between mobile switching center 56 and monitoring center 60, decompression for subscriber unit 36 is performed at subscriber unit 36, and decompression for second device 48 is performed in the call path formed between intercepting node 34 and second device 48, such as in gateway 34' (see FIG. 2). Accordingly, decompression operations for both half-calls and for monitoring center 60 are performed independently from one another.

Figure 4:
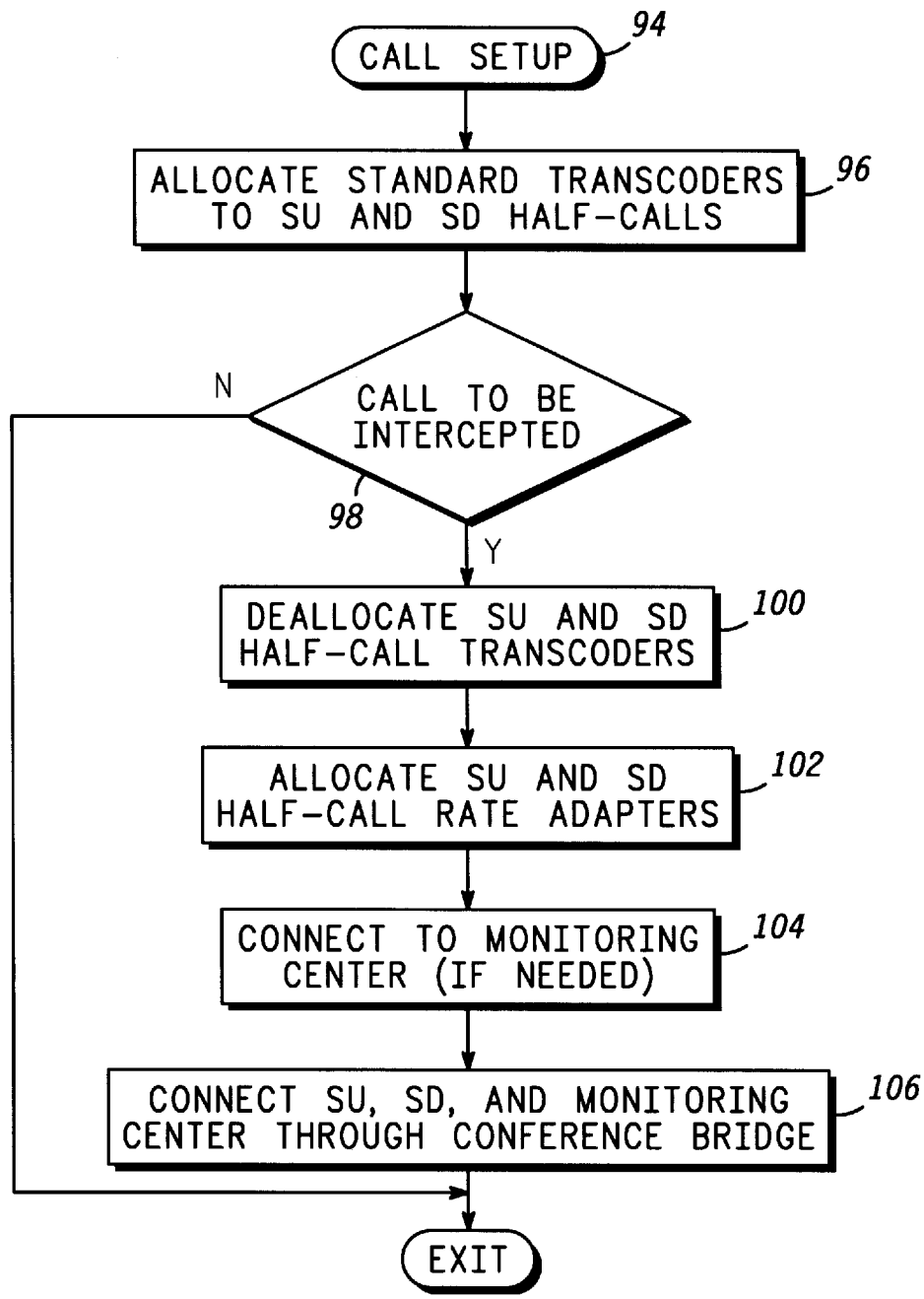
FIG. 4 shows a flow chart of a call setup process performed at the gateway.

FIG. 4 shows a flow chart of a call setup process 94 performed at intercepting node 34. Process 94 is performed to establish a call between subscriber unit 36 and second device 48. As indicated by ellipsis in FIG. 4, any number of conventional steps not relevant to the present invention may be performed by process 94. For example, such steps include the allocation of network resources so that a call path between subscriber unit 36 and second device 48 passes through intercepting node 34, the establishment of a call record, and the like. Within intercepting node 34, BSS-MAP like instructions are passed between earth terminal controller 54 and mobile switching center 56 (see FIG. 3) to route call data packets through packet router 72 (see FIG. 3). As indicated in step 96, process 94 allocates standard rate transcoders 50 (see FIG. 3) to each of the subscriber unit and second device half-calls. Step 96 is performed for all calls, whether or not the calls are being intercepted.

Eventually, call setup process 94 performs a query step 98. Step 98 determines whether the call is to be intercepted. Step 98 may evaluate a table (not shown) stored in mobile switching center 56 to make its determination. If the table includes an active flag associated with a subscriber unit identifier, then the call is to be intercepted. When step 98 determines that the call is not to be intercepted, program control may exit process 94. At this point the call has been set up and the call may commence.

When step 98 determines that the call is to be intercepted, step 100 deallocates the subscriber unit (SU) and second device (SD) half-call transcoders allocated above in step 96 in the gateway (34, FIG. 3). Thus, step 100 causes earth terminal controller 54 (see FIG. 3) to refrain from decompressing compressed and return compressed call data. After step 100, step 102 configures earth terminal controller 54 to allocate a rate adapter 80 (see FIG. 2) to the subscriber unit (SU) half-call and to the second device (SD) half-call. The allocated rate adapters 80 are substituted for the previously allocated transcoders 50 in call paths routed between packet router 72 and mobile switching center 56 (see FIG. 3).

Next, step 104 forms a connection to monitoring center 60 (see FIG. 2) if needed. In alternate embodiments, step 104 may form a connection to a recording device, or a permanent connection may be formed to monitoring center 60 so that step 104 may be omitted altogether. After step 104, step 106 connects the subscriber unit half-call, second device half-call, and the monitoring center connection together through conference bridge 90 (see FIG. 3).

After step 106, program control exits call setup process 94. The call has been established so that it may be unobtrusively intercepted. As discussed above, unobtrusive interception is accomplished by using rate adapters to bypassing transcoders in the two half-call paths passing through earth terminal controller 56. Compressed call data are decompressed after being combined in a conference bridge.

In summary, the present invention provides an improved radio telecommunication network and method for unobtrusive call interception via transcoder bypass. The network and method described herein permit the use of maximal lossy data compression while intercepting calls unobtrusively. Calls are intercepted without inserting noticeable delay in the call paths that are being intercepted, and calls are intercepted without noticeably degrading voice signal quality. In addition, the network and method described herein may employ space-based nodes which need not otherwise route call paths through mobile switching centers located within the geographic jurisdiction of a country requesting a call interception.

The present invention has been described above with reference to preferred embodiments. However, those skilled in the art will recognize that changes and modifications may be made in these preferred embodiments without departing from the scope of the present invention. For example, those skilled in the art can configure process steps and gateway elements differently than described herein while achieving a substantially equivalent structure and method. These and other changes and modifications which are obvious to those skilled in the art are intended to be included within the scope of the present invention.

What is claimed is:

1. A method of unobtrusively intercepting a call between a subscriber unit and a second device at an intercepting network node routed through a radio link of a telecommunication network, said method comprising the steps of:
    a) receiving first compressed call data from said subscriber unit and second compressed call data from said second device;
    b) converting said first and second compressed call data from a first data rate to a second data rate if said call is to be intercepted;
    c) generating a compressed combined call data from said first and second compressed call data having said second data rate, if said call is to be intercepted;
    d) routing said first compressed call data having said second data rate toward said second device; and
    e) routing said compressed combined call data having said second data rate toward a monitoring center, if said call is to be intercepted.

2. A method as recited in claim 1, further comprising the step of:
    f) decompressing said compressed-combined call data within said communication path.

3. A method as recited in claim 2, wherein said step a) includes the step of establishing said call between a subscriber unit and a second device and establishing a portion of the call path between said intercepting network node and said second device; and
    wherein said method further comprises the step of decompressing said first compressed call data within said portion of said call path.

4. A method as recited in claim 1, wherein step (b) comprises the steps of:
    determining that said call is to be intercepted; and
    refraining, in response to said determining step, from decompressing said first and second compressed call data.

5. A method as recited in claim 4, wherein step (a) comprises the step of allocating first and second transcoders at said intercepting network node to said call; and
    wherein said refraining step comprises the step of deallocating said first and second transcoders.

6. A method as recited in claim 4, wherein step (a) comprises the steps of:
    receiving said first and second compressed call data at said first data rate; and
    allocating, in response to said determining step, a first rate adaptor to said call, said first rate adaptor being configured to adapt said first compressed call data to said second data rate, said second data rate being greater than said first data rate; and
    allocating, in response to said determining step, a second rate adaptor to said call, said second rate adaptor being configured to adapt said first compressed call data having said second data rate from said second data rate to said first data rate.

7. A method as recited in claim 1, wherein step (b) includes the step of receiving said first compressed call data from said subscriber unit at an in-view satellite network node, said in-view satellite network node being located in outer space.

8. A method as recited in claim 7, wherein:
    said in-view satellite network node is one of a plurality of satellites and having RF communication trunks therebetween; and
    wherein each of said satellites has a radio coverage area extending over a portion of earth's surface.

9. A method as recited in claim 7, further comprising the steps of:
    locating said intercepting network node proximate earth's surface; and
    transmitting said first compressed call data from said in-view satellite network node to said intercepting network node.

10. A method as recited in claim 9 wherein:
    said in-view satellite network node has a coverage area; and
    said intercepting network node and said subscriber unit reside within said coverage area.

11. A method of unobtrusively intercepting a call between a subscriber unit and a second device, said method comprising the steps of:
    a) establishing said call between a subscriber unit and a second device;
    b) obtaining call data at the subscriber unit;
    c) compressing said call data at said subscriber unit to obtain compressed call data;
    d) transmitting said compressed call data to an intercepting network node;
    e) converting said compressed call data from a first data rate to a second data rate if said call is to be intercepted;
    f) routing said compressed call data having said second data rate through a conference bridge at said intercepting network node, said conference bridge generating compressed-combined call data having said second data rate;
    g) routing said compressed call data having said second data rate toward said second device; and
    h) routing said compressed-combined call data toward a monitoring center, if said call is to be intercepted.

12. A method as recited in claim 11 wherein step (b) includes the step of configuring said compressing to achieve approximately maximal lossy compression.

13. A method as recited in claim 11 wherein step (b) includes the step of configuring said compressing so that said compressed call data form a stream of data occurring at a rate of less than 6400 bits/s.

14. A method as recited in claim 11 further comprising the steps of:

obtaining return call data at said second device;

compressing said return call data to obtain return compressed call data;

routing said return compressed call data to said intercepting network node;

routing said return compressed call data through said conference bridge to generate first and second return compressed-combined call data which are responsive to said return compressed call data;

routing said first return compressed-combined call data toward said subscriber unit; and routing said second return compressed-combined call data toward said monitoring center.

15. A method as recited in claim 11 wherein:

step (a) includes the step of forming a departing portion of a call path between said subscriber unit and said second device; and said method further comprises the step of refraining from performing more than one compressing operation within said departing portion of the call path.

16. A radio telecommunication network allowing unobtrusive interception of a call established between a subscriber unit and a second device, said network comprising:

a plurality of network nodes in communication with one another, wherein one of said network nodes is in radio communication with said subscriber unit, one of said network nodes is in communication with said second device, and one of said network nodes is an intercepting node;

wherein said intercepting node comprises:

a terminal controller in communication with said network node that is in radio communication with said subscriber unit, said terminal controller being configured to receive compressed call data generated by said subscriber unit;

a rate adapter being coupled to the terminal controller and being configured to convert said compressed call data from a first data rate to a second data rate if said call is to be intercepted; and a conference bridge coupled to said rate adapter being configured to generate compressed-combined call data having said second data rate, wherein said compressed-combined call data having said second data rate are routed through said rate adapter and terminal controller toward said second device and toward a monitoring center.

17. A radio telecommunication network as recited in claim 16, wherein:

said monitoring center comprises means for decompressing said first compressed call data having said second data rate within said first call path; and wherein said network further comprises means for converting said compressed call data from said second data rate to said first data rate.

18. A radio telecommunication network as recited in claim 16, wherein:

said one network node in radio communication with said subscriber unit is located in a satellite; and said intercepting node resides proximate earth's surface.

* * * * *